(12) United States Patent
Du et al.

(10) Patent No.: US 10,045,281 B2
(45) Date of Patent: Aug. 7, 2018

(54) METHOD, APPARATUS AND SYSTEM

(71) Applicant: Nokia Solutions and Networks Oy, Espoo (FI)

(72) Inventors: Lei Du, Beijing (CN); Ingo Viering, Munich (DE); Yang Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/517,920

(22) PCT Filed: Oct. 23, 2014

(86) PCT No.: PCT/CN2014/089273
§ 371 (c)(1),
(2) Date: Apr. 7, 2017

(87) PCT Pub. No.: WO2016/061783
PCT Pub. Date: Apr. 28, 2016

(65) Prior Publication Data
US 2017/0311233 A1    Oct. 26, 2017

(51) Int. Cl.
*H04W 36/00*   (2009.01)
*H04W 48/12*   (2009.01)
*H04W 36/18*   (2009.01)
*H04W 36/24*   (2009.01)
*H04W 36/14*   (2009.01)
(Continued)

(52) U.S. Cl.
CPC .......... *H04W 48/12* (2013.01); *H04W 36/18* (2013.01); *H04W 36/24* (2013.01); *H04W 36/08* (2013.01); *H04W 36/12* (2013.01); *H04W 36/14* (2013.01)

(58) Field of Classification Search
CPC .............................. H04W 72/042; H04W 16/24
USPC ...... 455/422.1, 436, 437, 423, 452.2, 432.1, 455/453, 442; 370/235, 329, 252, 328, 370/389
See application file for complete search history.

(56) References Cited

U.S. PATENT DOCUMENTS

2010/0103854 A1    4/2010  Lee et al.
2011/0294508 A1*  12/2011  Min ................... H04W 36/0083
                                                     455/436
(Continued)

FOREIGN PATENT DOCUMENTS

CN           1984489 A      6/2007
CN         101686580 A      3/2010
(Continued)

OTHER PUBLICATIONS

International Search Report and Written Opinion received for corresponding Patent Cooperation Treaty Application No. PCT/CN2014/089273, dated Oct. 23, 2014, 11 pages.
(Continued)

*Primary Examiner* — Kiet Doan
(74) *Attorney, Agent, or Firm* — Harrington & Smith

(57) ABSTRACT

There is provided a method comprising, for a UE associated with a first base station in a first cell of a plurality of cells, receiving first system information and second system information, said first system information associated with the first cell, said second system information associated with the plurality of cells and, when the UE moves to a second cell of the plurality of cells, updating said first information and maintaining said second information.

18 Claims, 7 Drawing Sheets

(51) Int. Cl.
　　　*H04W 36/08*　　　(2009.01)
　　　*H04W 36/12*　　　(2009.01)

(56)　　　　　References Cited

U.S. PATENT DOCUMENTS

| | | | | |
|---|---|---|---|---|
| 2013/0077508 | A1* | 3/2013 | Axmon | H04W 24/00 |
| | | | | 370/252 |
| 2013/0322375 | A1* | 12/2013 | Chang | H04W 72/0426 |
| | | | | 370/329 |
| 2015/0087313 | A1* | 3/2015 | Kim | H04W 8/02 |
| | | | | 455/437 |

FOREIGN PATENT DOCUMENTS

| | | |
|---|---|---|
| EP | 3079407 A1 | 10/2016 |
| WO | WO-2013068368 A1 | 5/2013 |

OTHER PUBLICATIONS

Qualcomm Europe: "Granularity of Information at SIB Modification" 3GPP Draft; R2-085587, $3^{rd}$ Generation Partnership Project (3GPP), Mobile Competence Centre; 650, Route Des Lucioles; F-06921 Sophia-Antiplois Cedex; France, no. Prague, Czech Republic; 20080923, Sep. 23, 2008 (Sep. 23, 2008), XP050320391 [retrieved on Sep. 23, 2008].

"Delivery of LTE System Information" 3GPP Draft; R2-061959 Delivery of System Information, $3^{rd}$ Generation Partnership Project (3GPP), Mobile Competence Centre; 650, Route Des Lucioles; F-06921 Sophia-Antipolis Cedex; France, vol. RAN WG2, no. Cannes, France; 20060627-20060630, Jun. 22, 2006 (Jun. 22, 2006), XP050607834, [retrieved on Jun. 22, 2006].

\* cited by examiner

```
┌─────────────────────────────────────┐
│ For a UE associated with a first    │
│ base station in a first cell of a   │
│ plurality of cells, receiving first │
│ system information and second       │
│ system information, said first      │
│ system information associated with  │
│ the first cell, said second system  │
│ information associated with the     │
│ plurality of cells                  │
└─────────────────────────────────────┘
                    │
┌─────────────────────────────────────┐
│ When the UE moves to a second cell  │
│ of the plurality of cells, updating │
│ said first information and          │
│ maintaining said second information │
└─────────────────────────────────────┘
```

Figure 4

METHOD, APPARATUS AND SYSTEM

RELATED APPLICATION

This application was originally filed as Patent Cooperation Treaty Application No. PCT/CN2014/089273filed Oct. 23, 2014.

The present application relates to a method, apparatus and system and in particular but not exclusively, mobility in small cells.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. This disclosure relates to a mobility study in 5G. In particular, it relates to organization of system information to avoid unnecessarily acquiring system information, improving signalling efficiency and decreasing UE energy consumption.

In a first aspect there is provided a method comprising, for a UE associated with a first base station in a first cell of a plurality of cells, receiving first system information and second system information, said first system information associated with the first cell, said second system information associated with the plurality of cells; and, when the UE moves to a second cell of the plurality of cells, updating said first information and maintaining said second information.

The method may comprise receiving an indication that at least one of the first information and second information has changed; and updating the at least one of the first information and the second information.

The method may comprise receiving said indication on a paging channel.

The method may comprise receiving information identifying the plurality of cells associated with the second information.

Said identification information may be provided with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The method may comprise, in the absence of identification information, determining that the second system information is associated with all of the cells of a cloud.

The method may comprise receiving second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a second aspect, there is provided a method comprising providing first system information and second system information, said first system information associated with a first cell of a plurality of cells, said second system information associated with the plurality of cells.

The method may comprise providing an indication that at least one of the first information and second information has changed.

The method may comprise providing said indication on a paging channel.

The method may comprise providing information identifying the plurality of cells associated with the second information.

The method may comprise providing said identification information with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The method may comprise providing second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a third aspect there is provided an apparatus, said apparatus comprising means for, for a UE associated with a first base station in a first cell of a plurality of cells, receiving first system information and second system information, said first system information associated with the first cell, said second system information associated with the plurality of cells; and, means for, when the UE moves to a second cell of the plurality of cells, updating said first information and maintaining said second information.

The apparatus may comprise means for receiving an indication that at least one of the first information and second information has changed; and means for updating the at least one of the first information and the second information.

The apparatus may comprise means for receiving said indication on a paging channel.

The apparatus may comprise means for receiving information identifying the plurality of cells associated with the second information.

Said identification information may be provided with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The apparatus may comprise means for, in the absence of identification information, determining that the second system information is associated with all of the cells of a cloud.

The apparatus may comprise means for receiving second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a fourth aspect there is provided an apparatus, said apparatus comprising means for providing first system information and second system information, said first system information associated with a first cell of a plurality of cells, said second system information associated with the plurality of cells.

The apparatus may comprise means for providing an indication that at least one of the first information and second information has changed.

The apparatus may comprise means for providing said indication on a paging channel.

The apparatus may comprise means for providing information identifying the plurality of cells associated with the second information.

The apparatus may comprise means for providing said identification information with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The apparatus may comprise means for providing second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a fifth aspect there is provided an apparatus, said apparatus comprising at least one processor and at least one memory including a computer program code, the at least one memory and the computer program code configured to, with the at least one processor, cause the apparatus at least to: for a UE associated with a first base station in a first cell of a plurality of cells, receive first system information and second system information, said first system information associated with the first cell, said second system information associated with the plurality of cells; and, when the UE moves to a second cell of the plurality of cells, update said first information and maintaining said second information.

The apparatus may be configured to receive an indication that at least one of the first information and second information has changed; and update the at least one of the first information and the second information.

The apparatus may be configured to receive said indication on a paging channel.

The apparatus may be configured to receive information identifying the plurality of cells associated with the second information.

Said identification information may be provided with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The apparatus may be configured to, in the absence of identification information, determine that the second system information is associated with all of the cells of a cloud.

The apparatus may be configured to receive second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a sixth aspect there is provided an apparatus, said apparatus comprising at least one processor and at least one memory including a computer program code, the at least one memory and the computer program code configured to, with the at least one processor, cause the apparatus at least to: provide first system information and second system information, said first system information associated with a first cell of a plurality of cells, said second system information associated with the plurality of cells.

The apparatus may be configured to provide an indication that at least one of the first information and second information has changed.

The apparatus may be configured to provide said indication on a paging channel.

The apparatus may be configured to provide information identifying the plurality of cells associated with the second information.

The apparatus may be configured to provide said identification information with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The apparatus be configured to provide second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a seventh aspect there is provided a computer program embodied on a non-transitory computer-readable storage medium, the computer program comprising program code for controlling a process to execute a process, the process comprising for a UE associated with a first base station in a first cell of a plurality of cells, receiving first system information and second system information, said first system information associated with the first cell, said second system information associated with the plurality of cells and, when the UE moves to a second cell of the plurality of cells, updating said first information and maintaining said second information.

The process may comprise receiving an indication that at least one of the first information and second information has changed; and updating the at least one of the first information and the second information.

The process may comprise receiving said indication on a paging channel.

The process may comprise receiving information identifying the plurality of cells associated with the second information.

Said identification information may be provided with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The process may comprise, in the absence of identification information, determining that the second system information is associated with all of the cells of a cloud.

The process may comprise receiving second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In an eighth aspect there is provided a computer program embodied on a non-transitory computer-readable storage medium, the computer program comprising program code for controlling a process to execute a process, the process comprising providing first system information and second system information, said first system information associated with a first cell of a plurality of cells, said second system information associated with the plurality of cells.

The process may comprise providing an indication that at least one of the first information and second information has changed.

The process may comprise providing said indication on a paging channel.

The process may comprise providing information identifying the plurality of cells associated with the second information.

The process may comprise providing said identification information with at least one of the first information and the second information.

Said identification information may comprise a cell list.

Said cell list may comprise a list of cell-specific identities.

Cell specific identities may comprise physical cell identities.

Said identification information may comprise an indication that the second system information is associated with all of the cells of a cloud.

The process may comprise providing second system information on a first frequency resource, said second system information being provided on the first frequency resource for each cell with which the second system information is associated.

The first system information may comprise at least one of downlink bandwidth, physical hybrid-ARQ indicator channel configuration, system frame number, cell identity, cell specific offset of intra frequency cell reselection and scheduling information of second system information.

The second system information may comprise at least one of cloud identity, system frame number, public land mobile network identity, tracking area identity, cell selection parameters, intra-frequency/inter-frequency/inter-radio access technology cell reselection parameters and access related information.

At least one of the first and second system information may include period and scheduled system information.

A master information block and a system information block may include periodic system information and scheduled system information respectively.

In a ninth aspect there is provided a computer program product for a computer, comprising software code portions for performing the steps the method of the first and/or second aspects when said product is run on the computer.

In the above, many different embodiments have been described. It should be appreciated that further embodiments may be provided by the combination of any two or more of the embodiments described above.

FIG. 4 shows a flow chart of a method of acquiring system information

Before explaining in detail the examples, certain general principles of a wireless communication system and mobile communication devices are briefly explained with reference to FIGS. 1 to 2 to assist in understanding the technology underlying the described examples.

Figure 1:
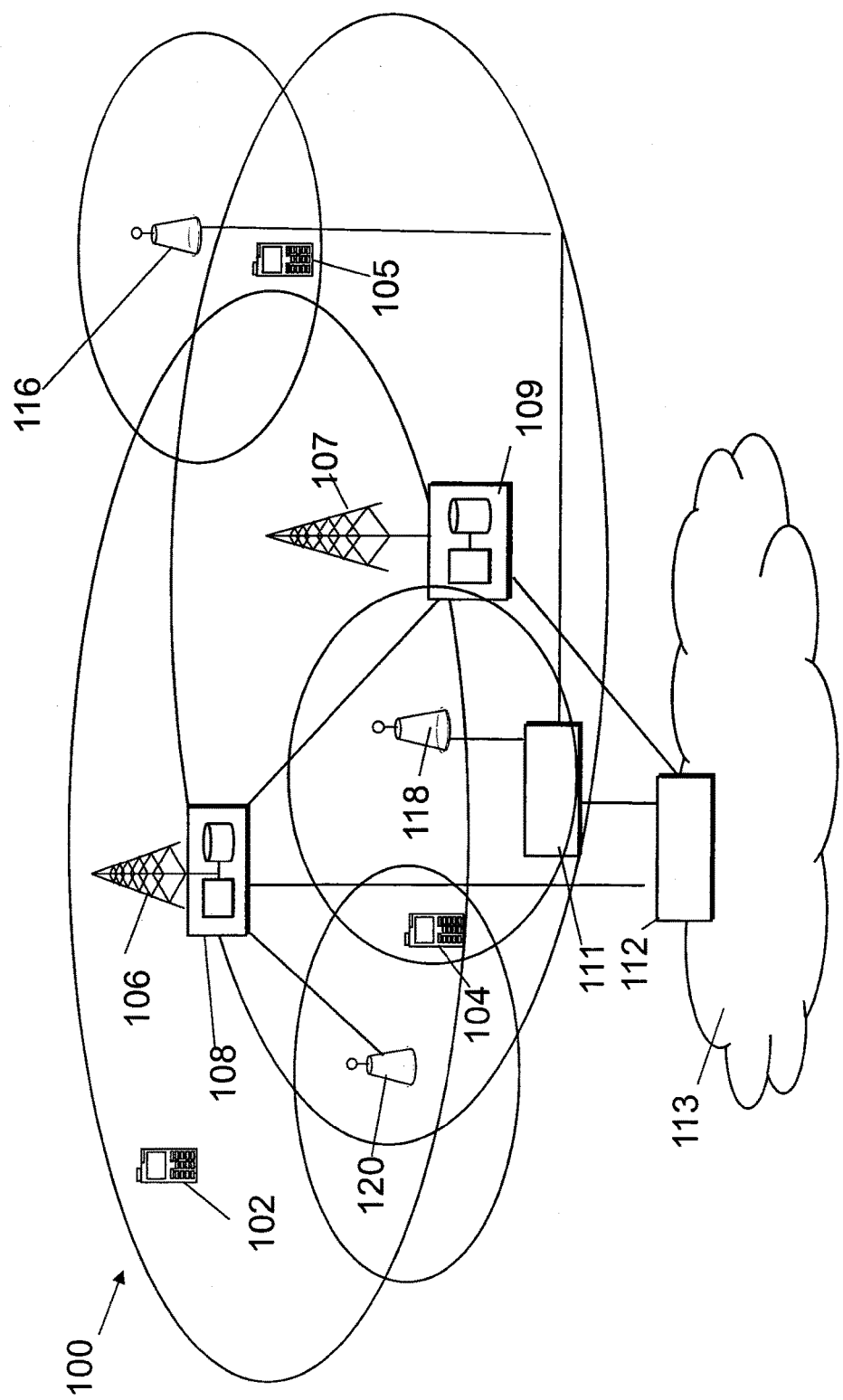
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
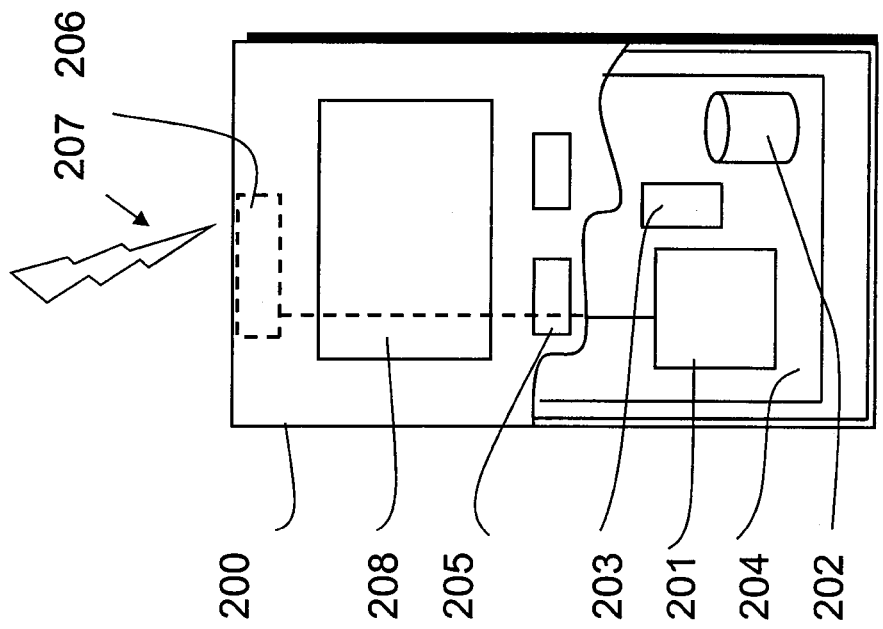
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Figure 3:
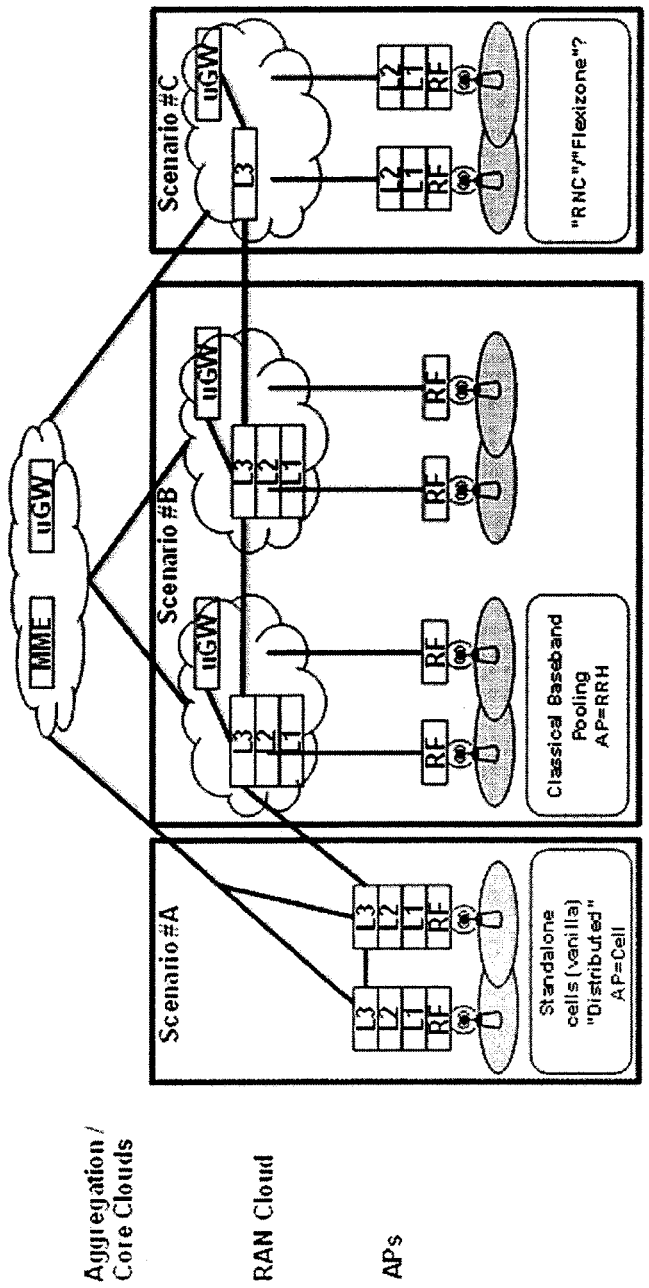
FIG. 3 shows mobility scenarios in 5G small cells.

Deployment scenarios of 5G small cells are shown in FIG. 3. Improvements for 5G small cell aim to meet predicted future requirements, e.g. supporting orders of magnitude more traffic, reducing latency, for example to 1 ms, flat energy consumption etc.

Scenario A in FIG. 3 shows a standalone scenario where a cell has the control of functionalities from L1 to L3 and is connecting to other cells via ideal or non-ideal backhaul. This is a basic mobility scenario on which mainstream technologies in 3GPP, e.g. carrier aggregation (CA), dual connectivity etc., are based.

Scenario B shows a baseband pooling scenario where the functionalities L1 to L3 are located in the radio access network (RAN) cloud and the radio remote heads (RRH) are distributed via fronthaul. In contrast to the fully-distributed standalone scenario, in scenario B, there is a centralized common L2 (and above) being shared by all the cells i.e. RRHs.

In scenario C, the functionalities L1 to L3 are separated between RAN cloud and cells. In this scenario, all the cells share a common L3 located in the cloud, while still have independent control over lower layers i.e. L1/L2. L3 may include RRC-like functionalities, for example, L3 may include functionalities of broadcasting system information.

This disclosure focuses on the scenarios having a common L3, e.g. the situation shown in scenarios B and C, and proposes the possibility of reorganizing the system information from the cloud point of view to facilitate UE's system information acquisition.

In 3GPP, system information may be divided into Master Information block (MIB) and multiple system information blocks (SIBs). The MIB may include a limited number of the most essential and most frequently transmitted parameters that are needed to acquire other information from the cell. The SIBs other than SIB1 may be scheduled by SIB1.

According to 3GPP TS 36.331, a UE may acquire system information in such cases as, e.g., entering a new cell, handover, system information change, etc. As the UE does not know whether and which SIB has changed, it may acquire the whole system information for each incidence of a case, such as the examples described above, which may increase the time taken and unnecessarily consume UE energy.

In the scenarios with a common L3, such as the scenarios B and C shown in FIG. 3, the L3 related functionality is centralized inside the cloud, and the related information including, amongst others, cell reconfiguration information, UE context information etc., may be shared within the cloud. As one of the L3 functionalities, the system information of all the cells may be located inside the cloud and may be managed together. The UE may know whether it needs to acquire system information and which part of the system information the UE needs to acquire when changing a cell.

In 3GPP, the system information is grouped into different system information blocks (SIBs) depending on the importance of the information. For instance, Master system information block (MIB) represents the most critical information that a UE requires to recognize a cell, and the SIB1 includes the scheduling information of other SIBs. The other SIBs may be relatively less significant and scheduled in following frames. To avoid reading unnecessary SIBs, the UE may read all SIBs depending on UE capability when the UE is in idle mode, but may skip SIB3-7, which include cell reselection parameters, when the UE is in connected mode.

One optimization may be to indicate the change of SIBs respectively, e.g. introducing a bitmap to indicate whether the SIB is changed for SIB1 to SIB14 accordingly. This may be at the cost of the signalling of system information change indication. This option applies to the case when the system information is changed in a cell. The UE may still need to acquire all the system information when changing a cell.

While the UE is in handover procedure, the target cell may send some essential system information to the UE via handover command. However, in most cases, the UE may still need to acquire all system information after handover completion to keep the information up-to-date.

FIG. 4 shows a method suitable for organization of system information to avoid unnecessarily acquiring system information, improving signalling efficiency and decreasing UE energy consumption. The method comprises, for a UE associated with a first base station in a first cell of a plurality of cells, receiving first system information and second system information, said first system information associated with the first cell, said second system information associated with the plurality of cells. In a second step, the method comprises updating said first information and maintaining said second information when the UE moves to a second cell of the plurality of cells.

System information may be categorised into first system information, or cell-specific system information (SI), and second system information, or common system information (SI), depending on whether the information applies to multiple cells or single cell.

The common SI may include system information which is the same in multiple cells inside a cloud. As the common L3 has the knowledge of all the SI parameters in all cells, it can put the same SI parameters into the common SI depending on the configuration. The cell may indicate whether the common SI applies to the whole cloud e.g. by setting a default value, or a cell list indicating the cells to which the common SI applies.

Figure 5:
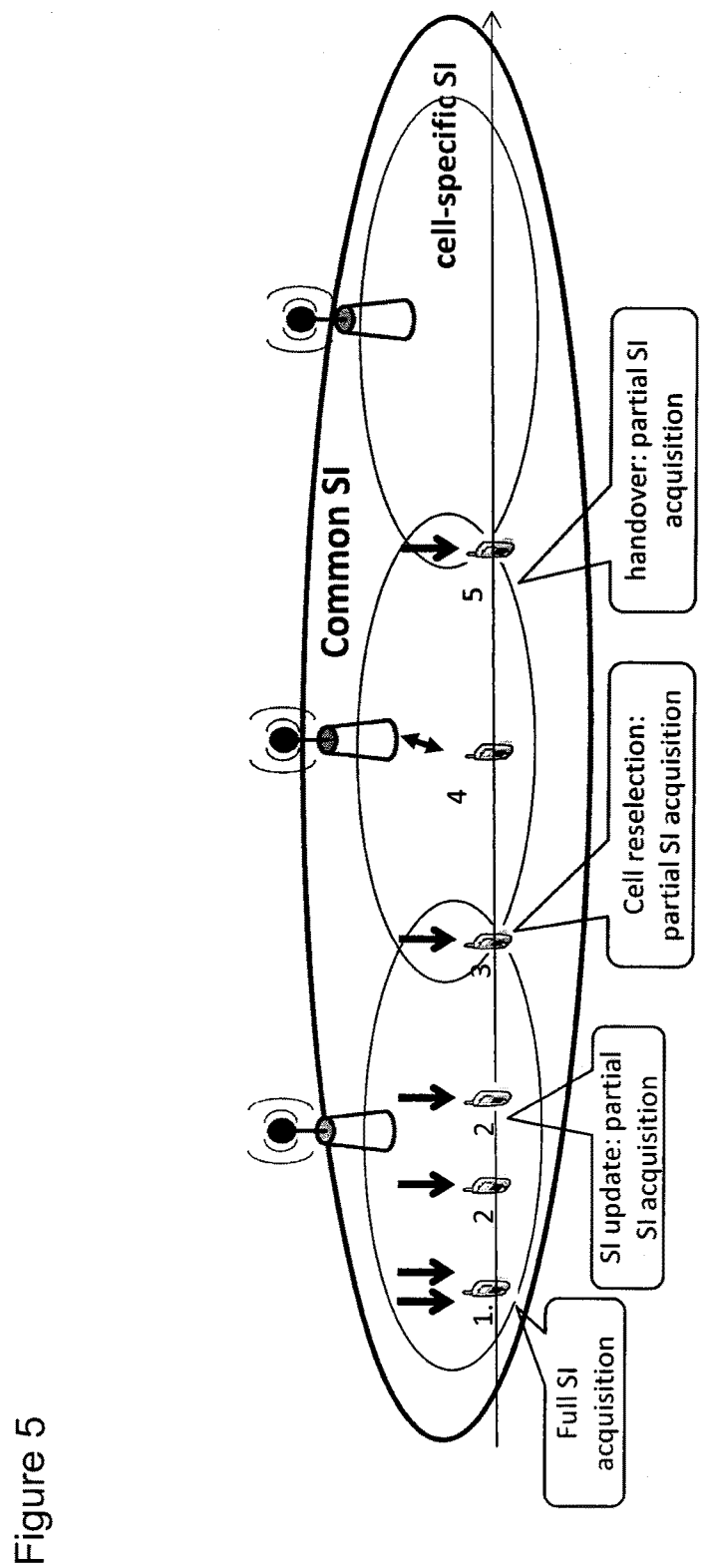
FIG. 5 shows a schematic diagram of a UE mobile in cells of a cloud.

For example, the common SI may include system information which is the same in all the cells inside a cloud, e.g., cloud identity, system frame number, PLMN identity, cell selection parameters, intra-frequency/inter-frequency/inter-RAT cell reselection parameters and access related information, and optionally a cell list or an indication that the SI applies to all the cells of a cloud. A cell list may indicate the cells to which the common SI applies or does not apply inside a cloud. Absence of the list may mean the common SI applies to the whole cloud. The information identifying the plurality of cells associated with the second, or common, SI may comprise a cell list, for example a list of cell-specific identities, such as physical cell identity (PCI). PCI may be used if the cell list exists. As shown in FIG. 5, the common SI is advertised in the whole cloud.

In 5G scenario, common SI may include any one of Cloud ID, SFN (if all cells indicated are synchronized), PLMN ID, Tracking area ID, Cell reselection parameters, including intra-frequency, inter-frequency, inter-RAT, Access related configuration, e.g. the random access (this may not be cell specific) and whitelist/blacklist cell list.

Cell-specific SI may include, but is not limited to, DL-bandwidth, physical hybrid-ARQ indicator channel configuration (PHICH-config), system frame number (if different), cell identity, cell-specific offset of intra-frequency cell reselection, scheduling information of common SI (if the common SI is scheduled). First, or cell-specific, SI may include information identifying a plurality of cells associated with second, or common, SI. For example, a cell list may be provided in cell-specific SI. A cell list may comprise, for example. a list of cell-specific identities, such as physical cell identity (PCI). A cell list provided in cell-specific SI may include only neighbor cells.

Each cell may advertise the cell-specific SI. A method may comprise providing first system information and second system information, said first system information associated with a first cell of a plurality of cells, said second system information associated with the plurality of cells.

Two flags may be included in the paging message to indicate whether common and/or cell-specific part is changed in a cell. Upon receipt of the flag, the UE reacquires the corresponding SI.

While the UE moves to another cell in the same cloud, the UE skips reading the common SI and only acquires cell-specific SI if the common SI applies to the whole cloud, or if the new cell is in the cell list associated with the common SI.

It is noted that selection of the parameters in the common SI is up to the common L3 independence on the system information configuration to respective cells inside the cloud.

FIG. 5 shows how an example of how a UE may manage the common SI and cell-specific SI to keep the up-to-date system information according to a method such as that of FIG. 4.

In this example, UE enters the network and selects a cell. It acquires all the system information including common SI and cell-specific SI and decides to camp to the cell.

The UE monitors the paging channel while in idle mode. When it receives the flag indicating the change of SI, it may reacquire the corresponding SI depending on which flag is set.

When the UE is reselecting another cell during idle mode, the UE may read only the cell-specific SI in the new cell and skips the common SI.

The UE may initiate connection setup and become connected to a cell e.g. due to data arrival, paging etc.

When the UE is moving to another cell in connected mode, it performs handover and does not acquire common SI after handover completion. The target cell may indicate whether the UE needs to read cell-specific SI in the handover command message (for network controlled handover) or via the response message to the handover request (or Hello) message from the UE (for UE autonomous handover).

Common SI may be sent over the same time-frequency resource in all cells sharing the same common SI.

In this case, when a UE is moving to another cell, it can read the cell-specific SI to get the cell identity. Assuming the cell ID composes the cloud ID (in the similar way as eNB ID), if the cell has the same cloud ID as the previous cell or the cell is in the cell list of the common SI in the previous cell, the UE may skip common SI in the new cell and read only cell-specific SI.

The common SI can benefit from a "single frequency network" (SFN) gain, similar to a broadcast scenario. If the underlying transmission scheme is OFDM based and the cells are synchronized, the UEs may not experience interference from any neighbour transmitting the same SIB. This may allow for more aggressive modulation and coding schemes for the common SI.

Common SI may be sent over the different time-frequency resource in respective cells.

In this case, when a UE is moving to another cell, it may read the cell-specific SI to get the cell identity and decide whether it can skip common SI in the new cell in the option described above. The UE may need to find common SI based on the scheduling information in cell-specific SI.

The concept of common/cell-specific SI can be used in combination with MIB and SIB. For instance, the cell-specific SI could be further divided into a periodic part and a scheduled part. The periodic part may include the critical information, as MIB does, and is sent out periodically. The scheduled part may be scheduled by the periodic part as other SIBs in 3GPP. Another example is to embed the concept into MIB and SIB in 3GPP, e.g. including cloud ID into MIB so that a UE could detect whether it is staying in the same cloud coverage at the earliest time and therefore determine whether it is possible to skip reading the common part of MIB/SIB.

Figure 6B:
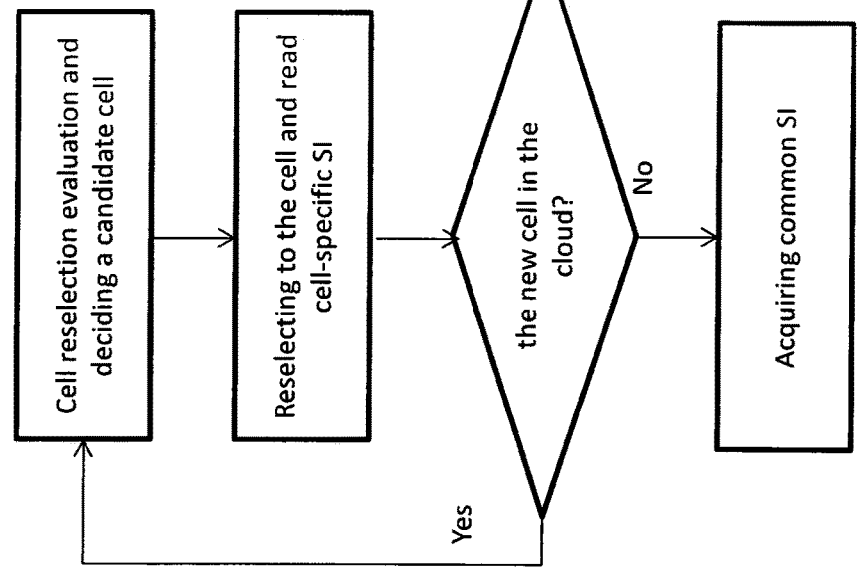
FIGS. 6a and 6b show flow charts of UE behaviour during a cell change.
Figure 6A:
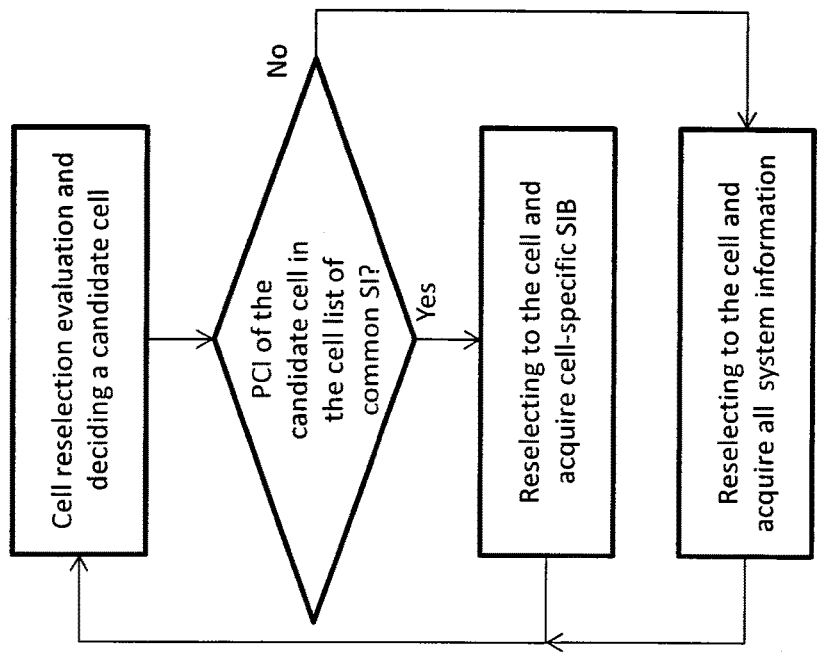

FIG. 6a shows a case where the common SI does not apply to the whole cloud. A cell list is used to indicate which cells the common SI applies. The cell list could be PCI to minimize the signalling. As the UE is able to know about the PCI of neighbour cells during measurement, it can decide whether to acquire common SI upon reselecting to the candidate cell. As mentioned above, to shorten the length of the cell list, the cell list may be included in cell-specific SI alternatively.

FIG. 6b shows a case where the common SI applies to the whole cloud. A cell list is not needed.

Since the UE acquires cell identity of a new cell to understand whether it is in the same cloud, the UE reads the cell-specific SI first to acquire the cell identity. After that, the UE can decide whether to acquire common SI or not. Alternatively, or in addition, if the cloud ID is included in MIB, the UE could decide whether it is possible to skip the common SI.

The system information acquisition procedure is simplified so that the UE can skip reading common SI when changing a cell, which may shorten UE access time and may save UE power consumption.

When the UE is in idle mode, the common SI may help the UE understand the accessibility of the neighbour cells, which may avoid the UE reselecting to an inaccessible cell. E.g. the presence of PLMN ID helps the UE to select the cell in the cell list of the common SI.

The flags of system information change may help the UE to identify explicitly which SI part to read, and avoid unnecessarily reading the same part of the system information.

It is also noted that the UE could benefit more from the common SI when more system information is common. If only several parameters are common or common only in one or two cells, the energy and efforts that the UE could save because of skipping common SI may be reduced. If the cell list is present, any benefit may be reduced because of the added signalling. So it may be the decision of the common L3 to decide whether to enable common SI depending on how much system information is common.

Figure 7:
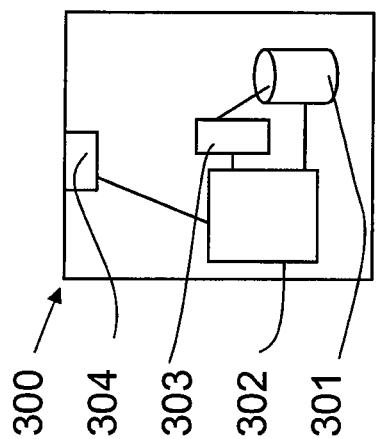
FIG. 7 shows a schematic diagram of an example control apparatus.

The method may be implemented in a device such as that of FIG. 2 and/or on a control apparatus as shown in FIG. 7. FIG. 7 shows an example of a control apparatus for a communication system, for example to be coupled to and/or for controlling a station of an access system, such as a base station or (e) node B, or a node of a core network such as an MME, or a server or host. The method may be implanted in a single control apparatus or across more than one control apparatus. The control apparatus may be integrated with or external to a node or module of a core network. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G, similar principles can be applied in relation to other communication networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising, for a user equipment associated with a first base station in a first cell of a plurality of cells,
receiving first system information and second system information, the first system information associated specifically with the first cell, the second system information associated with each of the plurality of cells, wherein the first system information comprises at least one of downlink bandwidth, physical hybrid-ARQ indicator channel configuration, system frame number, cell identity, cell specific offset of intra frequency cell reselection and scheduling information of the second system information;
in response to the user equipment moving to a second cell of the plurality of cells, updating the first system information to be associated specifically with the second cell and maintaining the second system information; and
permitting the user equipment to at least one of acquire other information associated with the first cell based on the first system information and acquire information associated with the plurality of cells based on the second system information.

2. An apparatus comprising at least one processor; and
at least one memory including computer program code;
the at least one memory and the computer program code configured to, with the at least one processor, cause the apparatus at least to:
for the user equipment associated with the first base station in a first cell of a plurality of cells, receive first system information and second system information, the first system information associated specifically with the first cell, the second system information associated with each of the plurality of cells, wherein the first system information comprises at least one of downlink bandwidth, physical hybrid-ARQ indicator channel configuration, system frame number, cell identity, cell specific offset of intra frequency cell reselection and scheduling information of the second system information; and,
in response to the user equipment moving to a second cell of the plurality of cells, update the first system information to be associated specifically with the second cell and maintain the second system information; and
permit the user equipment to at least one of acquire other information associated with the first cell based on the first system information and acquire information associated with the plurality of cells based on the second system information.

3. The apparatus according to claim 2, wherein the at least one memory and the computer program code are configured to, with the at least one processor, cause the apparatus to receive an indication that at least one of the first system information and second system information has changed; and updating the at least one of the first system information and the second system information.

4. The apparatus according to claim 3, wherein the at least one memory and the computer program code are configured to, with the at least one processor, cause the apparatus to receive said indication on a paging channel.

5. The apparatus according to claims 2, wherein the at least one memory and the computer program code are configured to, with the at least one processor, cause the apparatus to receive information identifying the plurality of cells associated with the second system information.

6. The apparatus according to claim 5, wherein said identification information is provided with at least one of the first system information and the second system information.

7. The apparatus according to claim 5, wherein said identification information comprises an indication that the second system information is associated with all of the cells of a cloud.

8. The apparatus according to claim 5, wherein said identification information comprises a cell list.

9. The apparatus according to claim 8, wherein said cell list comprises a list of cell-specific identities.

10. The apparatus according to claim 2, wherein the at least one memory and the computer program code are configured to, with the at least one processor, cause the apparatus to, in the absence of identification information, determine that the second system information is associated with all of the cells of a cloud.

11. The apparatus according to claim 2, wherein the at least one memory and the computer program code are configured to, with the at least one processor, cause the apparatus to receive second system information on a first frequency resource, said second system information being provided on the first frequency resource for each cell with which the second system information is associated.

12. The apparatus according to claim 2, wherein the second system information comprises at least one of cloud identity, system frame number, public land mobile network identity, tracking area identity, cell selection parameters, intra-frequency/inter -frequency/interradio access technology cell reselection parameters and access related information.

13. The apparatus according to claim 2, wherein at least one of the first and second system information includes periodic system information and scheduled system information.

14. The apparatus according to claim 13, wherein a master information block and a system information block includes periodic system information and scheduled system information respectively.

15. An apparatus comprising
at least one processor; and
at least one memory including computer program code; the at least one memory and the computer program code configured to, with the at least one processor, cause the apparatus at least to:
provide first system information and second system information, the first system information associated specifically with the first cell, the second system information associated with each of the plurality of cells, wherein the first system information comprises at least one of downlink bandwidth, physical hybrid-ARQ indicator channel configuration, system frame number, cell identity, cell specific offset of intra frequency cell reselection and scheduling information of the second system information, and
permit a user equipment to at least one of acquire other information associated with the first cell based on the first system information and acquire information associated with the plurality of cells based on the second system information.

16. The apparatus according to claims 15, wherein the at least one memory and the computer program code are configured to, with the at least one processor, cause the apparatus to send information identifying the plurality of cells associated with the second system information.

17. The apparatus according to claim 15, wherein the second system information comprises at least one of cloud identity, system frame number, public land mobile network identity, tracking area identity, cell selection parameters, intra-frequency/inter -frequency/interradio access technology cell reselection parameters and access related information.

18. The apparatus according to claim 15, wherein at least one of the first system information and the second system information includes periodic system information and scheduled system information.

* * * * *

UNITED STATES PATENT AND TRADEMARK OFFICE
CERTIFICATE OF CORRECTION

PATENT NO. : 10,045,281 B2
APPLICATION NO. : 15/517920
DATED : August 7, 2018
INVENTOR(S) : Du et al.

Page 1 of 1

It is certified that error appears in the above-identified patent and that said Letters Patent is hereby corrected as shown below:

In the Claims

In Claim 2, Column 16, Line 11, "the user equipment" should be deleted and --the apparatus-- should be inserted.

In Claim 2, Column 16, Line 11, "the first base" should be deleted and --a first base-- should be inserted.

In Claim 2, Column 16, Line 23, "the user equipment" should be deleted and --the apparatus-- should be inserted.

In Claim 2, Column 16, Line 27, "the user equipment" should be deleted and --the apparatus-- should be inserted.

Signed and Sealed this
Thirteenth Day of August, 2019

Andrei Iancu
*Director of the United States Patent and Trademark Office*